United States Patent [19]

Langdon

[11] 3,931,337

[45] Jan. 6, 1976

[54] MULTI-BLOCK POLYACETAL COPOLYMER SURFACTANTS

[75] Inventor: William K. Langdon, Grosse Ile, Mich.

[73] Assignee: BASF Wyandotte Corporation, Wyandotte, Mich.

[22] Filed: Aug. 19, 1974

[21] Appl. No.: 498,315

[52] U.S. Cl............. 260/615 A; 260/563; 260/571; 260/583 B; 260/584 B; 260/551; 260/611 B; 260/613 B
[51] Int. Cl.² .................. C07C 43/00; C07C 43/30
[58] Field of Search.................... 260/615 A, 611 A

[56] References Cited
UNITED STATES PATENTS

| | | | |
|---|---|---|---|
| 2,000,252 | 5/1935 | Reppe et al..................... | 260/615 A |
| 2,071,252 | 2/1937 | Carothers........................ | 260/615 A |
| 2,110,499 | 3/1938 | Carothers................... | 260/615 A X |
| 2,379,703 | 7/1945 | Geltner........................... | 260/615 A |
| 2,905,719 | 9/1959 | Benneville et al. ......... | 260/615 A X |
| 3,244,753 | 4/1966 | Leary.............................. | 260/615 A |

Primary Examiner—Howard T. Mars
Attorney, Agent, or Firm—Norbert M. Lisicki; Bernhard R. Swick; Robert E. Dunn

[57] ABSTRACT

Novel polyacetal compounds which are useful as surfactants are prepared by a transacetalization reaction. Polyoxyalkylene polymers are acetal terminated by reaction with alkyl vinyl ether compounds. These blocks are then subjected to a transacetalization reaction resulting in polyacetal compounds.

2 Claims, No Drawings

MULTI-BLOCK POLYACETAL COPOLYMER SURFACTANTS

BACKGROUND OF THE INVENTION

1. Field of the Invention

The present invention relates to novel polyacetal compounds which are useful as surfactants. More specifically, individual blocks of polymers and copolymers of alkylene oxides are reacted with various vinyl ether compounds forming acetal terminated blocks. These blocks are then subjected to a transacetalization reaction which results in a coupling of the individual blocks through acetal linkages into multi-block copolymers.

2. Prior Art

Surface active non-ionic acetals of monoethers of mono and polyalkylene glycols are known in the art. As taught in U.S. Pat. No. 3,244,753 these products which are produced by reacting monoethers of polyalkylene glycols with vinyl ethers in the presence of an acid catalyst are stable to degradation and discoloration in aqueous alkali. This patent covers a process for capping polyalkylene glycols by reaction with vinyl ethers. It does not teach the coupling of hydrophobic and hydrophilic blocks through an acetal interchange.

U.S. Pat. No. 2,905,719 teaches the preparation of surfactants by reacting vinyl ethers containing 8 to 18 carbon atoms with ethoxylated alcohols. There is no teaching of linking polyoxyethylene and polyoxypropylene groups by using low molecular weight vinyl ethers. Neither is there a teaching of an acetal interchange reaction.

None of the prior art teaches the preparation of the particular surface active compounds of this invention nor of the process employed for the preparation of these compounds.

SUMMARY OF THE INVENTION

It has now been discovered that a new class of surfactants may be prepared from polyacetal compounds by a process whereby polyoxyethylene and polyoxypropylene polymers are acetal terminated by reaction with a lower alkyl vinyl ether in the presence of an acid catalyst. The acetal terminated polymers are than coupled by a transacetalization reaction. The transacetalization reaction, an acetal interchange, is accomplished by distilling off alkyl acetal at reduced pressure at temperatures up to 150°C. The distillation results in a removal of part of the lower alkyl acetal, and a coupling of the polyoxyethylene and polyoxopropylene groups through acetal linkages.

This coupling process is continued until a product having the desired molecular weight is obtained. The various polyoxyalkylene groups can be pre-reacted to form blocks of varying structure and molecular weight. For example, it is possible to link several polyoxypropylene groups of about 400 molecular weight through acetal linkages. Another block of polyoxyethylene groups of about 400 molecular weight may be linked through acetal linkages. These two acetal terminated blocks may then be linked together to form any desired hydrophilic and hydrophobic ratio. It is generally well known that polyoxyalkylene polymer molecular weights below 900 exhibit poor detergency properties as taught by U.S. Pat. No. 2,674,619. Thus, it is surprising that these short polyoxyalkylene groups coupled through acetal linkages display such high surface activity. It is further surprising that random block copolymers having hydrophilic and hydrophobic blocks display surface activity.

DESCRIPTION OF THE PREFERRED EMBODIMENT

In accordance with this invention, polyoxyalkylene polymers are acetal terminated by reaction with lower alkyl vinyl ethers at a temperature range of from about 20°C. to about 80°C. preferably from about 20°C. to about 60°C. in the presence of an acidic catalyst. This is exemplified by the following equation:

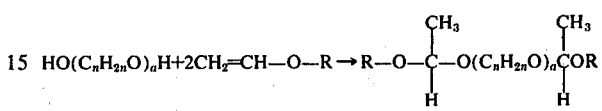

wherein R is an alkyl radical containing 1 to 4 carbon atoms, $n$ is 2 or 3 and $a$ is a number from 2 to 30.

Examples of acidic catalysts are hydrochloric acid, sulfuric acid, trifluoroacetic acid, p-toluene sulfonic acid and methane sulfonic acid. Methane sulfonic acid is preferred since it is liquid, highly active in trace quantities and results in little or no color change of the surfactant. The amount of catalyst employed may vary from 0.01 to about 1 weight percent based on the total weight of reactants. The amount of acid is not critical, however, it is necessary that the acetal and transacetalization reaction occur at an acid pH. This may range from about 2 to about 6.5, preferably from about 3 to about 6. In the event that the polyoxyalkylene polymers contain unneutralized alkaline catalyst, sufficient acid must be added to neutralize that catalyst and to lower the pH of the reaction mixture below a value of 6.

The acetal terminated polymers are then coupled by a transacetalization reaction at a temperature range of about 20°C. to about 150°C. at a pressure range of about 760 mm to about 1 mm. After the terminal hydroxyl groups have been reacted with an alkyl vinyl ether to form acetal end groups, the equilibrium is shifted by distilling off alkyl acetals at elevated temperatures and reduced pressures. This results in a coupling of oxyalkylene units through acetal groups. This is exemplified by the following equation which illustrates the transacetalization step:

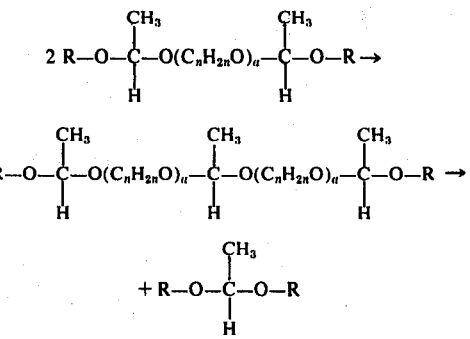

wherein R is an alkyl radical containing 1 to 4 carbon atoms, $n$ is 2 or 3 and $a$ is a number from 2 to 30.

This transacetalization is continued to produce multi-block copolymers.

The polyoxyalkylene polymers are prepared by reacting the alkylene oxide with a base compound containing a plurality of active hydrogen atoms. The base compounds preferably have molecular weights of less than 100.

The term active hydrogen atom is well known to those skilled in the art. It is sufficiently labile to react with ethylene, propylene or butylene oxide and it reacts with methyl magnesium iodide, liberating methane according to the classical Zerewitinoff reaction. The active hydrogen atoms are normally activated by either being members of a functional group such as a hydroxyl group, a phenol group, a carboxylic acid group, a basic nitrogen group such as an amine group, a hydrazine group, an imine group or an amide group. Active hydrogen atoms may also be activated by proximity to carbonyl groups such as acetoacetic ester. Examples of active hydrogen compounds which may be used as base compounds include ethylene glycol, diethylene glycol, propylene glycol, dipropylene glycol, butylene glycol, amylene glycol, hexylene glycol, heptylene glycol and octylene glycol.

The alkylene oxides which may be employed are ethylene oxide as a source of the hydrophile and propylene and butylene oxides as a source of the hydrophobes. Those preferred are ethylene oxide and propylene oxide.

The individual polyoxyalkylene polymers and copolymers employed in this invention may have a molecular weight from 200 to 2000 preferably from 200 to 1000.

The polyoxyalkylene polymers and copolymers employed in this invention are generally prepared by carrying out the condensation reaction of the alkylene oxides with the base compound in the presence of an alkaline catalyst in a manner well known to those skilled in the art. Catalysts which may be employed include sodium hydroxide, potassium hydroxide, sodium ethylate, sodium methylate, potassium acetate, sodium acetate, trimethylamine and triethylamine. Any other types of catalysts commonly used for alkylene oxide condensation reactions may also be employed. After the condensation reaction is completed, the catalyst may be removed from the reaction mixture by any known procedure, such as neutralization and filtration, or ion exchange. The condensation is preferably carried out at elevated temperatures and pressures. These condensation products are then subjected to the acetal coupling reactions to form the products of this invention.

The alkyl vinyl ethers which are preferably employed have the general formula
$$R-O-CH=CH_2$$
where R may be methyl, ethyl, propyl or butyl. It is contemplated that other vinyl ether compounds may also be employed if the resulting acetal compound may be readily removed by distillation and a transacetalization reaction accomplished.

The product of this invention can be exemplified by the following formula:

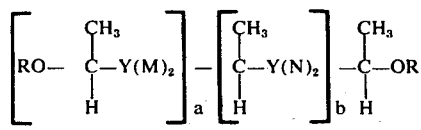

where R is an alkyl radical containing 1 to 4 carbon atoms, Y is the residue of an organic compound containing therein two terminal hydroxyl groups, M is a hydrophilic chain of units selected from the group consisting of oxyethylene and oxyethylene-oxypropylene units wherein the oxyethylene content of said hydrophilic chain is from about 75 to 100 weight percent and the oxypropylene content is from 0 to about 25 weight percent, the total number of oxyethylene and oxypropylene units in M being from about 4 to about 30, N is a hydrophobic chain of units selected from the group consisting of oxypropylene units and oxyethylene-oxypropylene units wherein the oxypropylene content is from about 75 to 100 weight percent and the oxyethylene content is from 0 to about 25 weight percent, the total number of oxyethylene and oxypropylene groups in N being from about 4 to about 20, and wherein groups

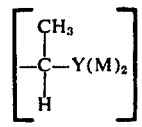

and

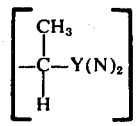

may be linked either in a random or an ordered manner, and $a$ and $b$ are numbers from 2 to 20 in a ratio between 1:9 to 9:1.

It is to be understood that the above formula as used in the specification and claims is a generalized formula and does not represent only a single block of acetal capped polyoxypropylene groups and a single block of acetal capped polyoxyethylene groups but on the contrary, the surfactants of this invention may be either of a random block variety or an ordered block type which may have considerably more than two blocks.

Random block surfactants are generally prepared by reacting for example a mixture of polypropylene glycol and polyethylene glycol with ethyl vinyl ether in the presence of an acid catalyst. This reaction is continued until all the hydroxyl groups of the glycols have been completely terminated with acetal groups. The reaction is carried out at a temperature preferably in the range of about 20°C. to about 60°C. The mixture is then evacuated to a pressure preferably below about 10 mm and acetal is removed over a 4 hour period while the temperature is gradually raised to from about 80°C. to about 100°C. This transacetalization reaction results in a coupling of the various blocks through acetal linkages to form the desired structures.

The time required for the acetal terminating reaction and for the transacetalization reaction is generally not a critical factor but will vary with the concentration of reactants and the reaction temperatures. Thus, the time can vary from about 15 minutes to about 10 hours in each step. From an economic point of view, however, it is impractical to continue the reaction for more than 10 hours. Generally, the reactions are completed within 5 hours.

Optionally, the random block surfactants may be prepared by forming the acetal terminated block of polyoxypropylene and polyoxyethylene units individually and then blending them together to undergo the transacetalization reaction.

Ordered block surfactants are prepared by reacting a polypropylene glycol and a polyethylene glycol individually with ethyl vinyl ether to form the terminal acetal groups. The individual acetal capped blocks are subjected to a transacetalization reaction at less than 10 mm pressure and at temperatures between 60° and 150°C. This results in creating polyacetal blocks of the individual polyglycols. Subsequently, these blocks are blended together in the amounts required to achieve the desired balance of hydrophilic and hydrophobic units. The blend is then subjected to a transacetalization reaction to link the hydrophilic and hydrophobic groups forming the desired product. The transacetalization reaction is effected by heating the blend at a temperature of about 80°C. to about 120°C. preferably at a pressure of less than 10 mm and removing enough acetal to achieve the desired molecular weight. Thus, it is possible to form a surfactant composed of low molecular weight hydrophilic and hydrophobic units coupled through acetal groups as shown by the following formula:

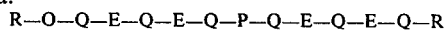

where R is a lower alkyl group containing from 1 to 4 carbon atoms,

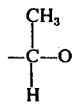

group,
E is a polyoxyethylene radical $(C_2H_4O)_n$ of about 200 to about 2000 molecular weight,
P is a polyoxypropylene radical $(C_3H_6O)_n$ of about 200 to about 2000 molecular weight and $n$ has a value from about 4 to 50. Since the hydrophobic and hydrophilic blocks are pre-prepared, the possibilities for varying the structure, by selection of the composition and molecular weight of the block, are quite extensive. Examples of other structures which may be formed are:

R—O—Q—E—Q—P—Q—E—Q—P—Q—E—Q—R and

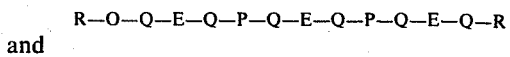

wherein R, E, P, and Q are as described above.

This unique structure of the acetal linked multiblock copolymers results in surfactants which are useful for a number of applications. They may be used as biodegradable or quasi-biodegradable surfactants. These molecules fragment into individual polyoxyalkylene glycols either biologically or hydrolytically under slightly acidic conditions. If the polyoxyalkylene glycols have a molecular weight below 1000, they have little effect on foaming and surface tension. These surfactants can be used in applications requiring good alkali stability. They are useful as antifoaming agents and as surfactants where very low foam is required. They may be used as surfactants or lubricants in textile applications in which removal of the surfactants or lubricant is required before subsequent processing steps are carried out. Removal can be readily accomplished by passing the textile material through a slightly acidic treating bath.

The following examples illustrate the invention. All parts are by weight unless otherwise stated.

EXAMPLE 1

Surfactant having hydrophobic center groups and hydrophilic end groups.

A. Preparation of Polypropylene Glycol Diacetal

A clean, dry, 2 liter reaction flask equipped with a stirrer, thermometer, reflux condenser and addition funnel was charged with 1502 grams of a polypropylene glycol, molecular weight 425, and 0.2 ml. of methane sulfonic acid. Ethylvinylether, (EVE) 476 grams, was added with stirring over an 85-minute period. The initial temperature of 27°C. rose to 36° during the first 20 minutes of the EVE addition. A temperature of 35°–37°C. was maintained over the remainder of the addition period. Stirring was allowed to continue until the reactor temperature dropped to 28°C.

B. Preparation of Polyethylene Glycol Diacetal

A clean, dry, 2 liter reaction flask equipped with a stirrer, thermometer, reflux condenser, addition funnel and vacuum pump was charged with 1200 grams of polyethylene glycol, molecular weight 400, and stripped at about 100°C. and 2 mm pressure to remove moisture. After cooling to room temperature 0.2 ml of methane sulfonic acid was added. Ethylvinylether was then added at a temperature range of 27°–37°C. in 1.3 hours. The reaction mass was stirred for an additional hour to insure a complete reaction.

C. Coupling of the Polypropylene Glycol Diacetal

The product of A (588 grams) was charged into a 2 liter flask equipped with a stirrer, thermometer, a dry ice cooled condenser, receiver, and a vacuum pump. The entire system was evacuated to a pressure of about 3 mm and acetal was distilled off while the temperature was increased from 28° to 80°C. The reaction was then discontinued by cooling the reaction mass to 35°C. and releasing the vacuum. The weight of product obtained was 492 grams. The amount of acetal removed corresponded to a linking of three polypropylene glycol units.

D. Preparation of the Polyacetal Copolymer

Polyethylene glycol diacetal (372g) obtained from (B) above was added to the 492 grams of product obtained in (C) above. The system was evacuated to 3 mm pressure and acetal was removed over a period of 1.5 hours while the temperature was gradually raised to 83°C. The flask was then allowed to cool to room temperature and the vacuum was released. The weight of product obtained was 776 grams. The amount of acetal removed corresponds to a joining of the block of two polyethylene glycol units to the block of three polypropylene glycol units to form an ordered block copolymer.

EXAMPLE 2

Copolymer Surfactant — Random Distribution of Hydrophilic and Hydrophobic Units.

A. Preparation of a Polypropylene Polyethylene Glycol Diacetal Mixture

A 2 liter reaction flask equipped with a stirrer, thermometer, reflux condenser, an addition funnel and a vacuum pump was charged with 480 grams polypropylene glycol, molecular weight 400, and 320 grams polyethylene glycol, molecular weight 400. The mixture was heated to 110°C. at about 2 mm pressure to remove moisture. After cooling to 30°C. approximately 0.06 ml of methane sulfonic acid was added. Ethylvinylether, 317 grams, was added with stirring over a period of 1 hour at a temperature of about 35°C. The stirring was continued for about 1 hour after the addition was completed. The system was then evacuated to a pressure of about 2 mm and acetal was distilled off over a period of 4.5 hours while the temperature was gradually raised from about 33° to about 78°C. The reaction was then discontinued by cooling the reaction mass to room temperature and releasing the vacuum. The weight of product obtained was 892.5 grams. The amount of acetal removed corresponds to a random block copolymer containing three polypropylene glycol units and two polyethylene glycol units.

EXAMPLE 3

Random Copolymer Surfactant

A. Preparation of Polypropylene Glycol Diacetal

A clean, dry, 3 liter reaction flask equipped with a stirrer, thermometer, reflux condenser and addition funnel was charged with 1975 grams of polypropylene glycol, molecular weight 790 and 0.3 grams of methane sulfonic acid. Ethylvinylether (EVE), 379 grams, was added with stirring over a period of 1.3 hours at a temperature range of 35°–40°C. Stirring was continued for an additional 3.2 hours.

B. Preparation of Polyethylene Glycol Diacetal

A clean, dry, 3 liter flask equipped with a stirrer, thermometer, reflux condenser, addition funnel and vacuum pump charged with 1800 grams of polyethylene glycol, molecular weight 600, was stripped at about 100°C. and 2 mm pressure to remove moisture. After cooling to room temperature and releasing the vacuum, 0.4 grams of methane sulfonic acid was added. Ethylvinylether, 498 grams, was added over a period of 1 hour at a temperature range of 40°–48°C. The reaction mixture was then stirred for an additional 4 hours to ensure a complete reaction.

C. Preparation of the Polyacetal Copolymer

A clean, dry, 2 liter flask equipped with stirrer, thermometer, reflux condenser, addition funnel and vacuum pump was charged with 300 grams of the diacetal of A and 300 grams of the diacetal of B above. The system was evacuated to a pressure of 2 mm and acetal was distilled off over a period of 6 hours while the temperature was gradually raised from about 24°C. to about 90°C. The yield of product obtained was 541 grams. The amount of acetal removed corresponds to a random block copolymer containing about five coupled polyethylene and polypropylene glycol units. This indicates an approximate molecular weight of about 3700.

EXAMPLE 4 ordered Block Copolymer - Hydrophobic Block Terminated

A. Preparation of Polyethylene Glycol Polyacetal

A clean, dry, 2 liter reaction flask equipped with a stirrer, thermometer, reflux condenser, addition funnel and vacuum pump was charged with 589 grams of polyethylene glycol, molecular weight 400, and 0.2 grams of methane sulfonic acid. Ethylvinylether, 238 grams, was then added at a temperature range of 27° to 35°C. over a 1 hour period. The reaction mass was stirred for an additional 40 minutes. Infra-red analysis indicated that all hydroxyl groups had reacted. The system was then evacuated to 25 mm pressure and acetal was removed over a period of 125 minutes at a temperature of 108°C. The amount of acetal removed corresponded to a linking of six polyethylene glycol units. The weight of product was 645 grams.

B. Preparation of Polypropylene Glycol Diacetal

A clean, dry, 2 liter reaction flask equipped with a stirrer, thermometer, reflux condenser, addition funnel and vacuum pump was charged with 651 grams of polypropylene glycol, molecular weight 425, and 0.6 grams of methane sulfonic acid. Ethylvinylether, 238 grams, was then added at a temperature range of 30° to 35°C. over a 1 hour period. The reaction mass was stirred for an additional 30 minutes. The weight of product obtained was 878.5 grams.

C. Preparation of the Polyacetal Copolymer

A clean, dry, 2 liter flask equipped with a stirrer, thermometer, reflux condenser, addition funnel and vacuum pump was charged with 468 grams of the product produced in A above and 400 grams of the product produced in B above. The pressure was reduced to about 5 mm and acetal was distilled off for a period of 1 hour while the temperature was gradually increased to 131.5°C. The amount of acetal removed corresponded to a product having a center block structure comprised of six acetal coupled polyethylene glycol units, terminated with an average of two acetal coupled polypropylene glycol units at each end. The weight of product obtained was 954 grams.

EXAMPLE 5

Preparation of a Random Copolymer

A clean, dry, 2 liter flask was charged with 612 grams of polypropylene glycol, molecular weight 1000, and 575 grams of polyethylene glycol, molecular weight 1500. This mixture was then stripped at 110°C. at 3 mm pressure to remove any moisture present. The temperature was then lowered to about 50°C. and 0.5 grams of methane sulfonic acid was added. Ethylvinylether, 159 grams, was added over a 1 hour period at a temperature range of 52.5° to 54°C. The reaction mass was then stirred for an additional 30 minutes. The system was then evacuated to 10 mm pressure and acetal was removed over a period of 120 minutes at a temperature range of 50° to 108°C. The weight of product obtained was 1237.5 grams.

The products of this invention generally exhibit a surface tension at 25°C. of less than 40 dynes/cm$^2$. They are very low foaming products and have good alkali stability.

The Table illustrates the excellent wetting action of the surfactants prepared in accordance with Examples 1–4. It also illustrates the low foaming properties of these products.

TABLE

| Example | Surfactant Properties | | | |
| --- | --- | --- | --- | --- |
|  | 1 | 2 | 3 | 4 |
| Cloud Point, 1% Solution, °C. | 9 | 10 | 52 | 11 |
| Surface Tension, 1% Solution, 25°C., dynes/cm$^2$ | 35.4 | 36.4 | 35.6 | 39.9 |
| Draves Sink time, 3g Hook, 0.1% Solution, 25°C., sec. | 38 | 45 | 42 | 54 |
| Dynamic Foam* 400 ml/min. at 77°F. | 55/10 | 50/5 | 170/70 | 45/2 |

TABLE-continued

| Example | Surfactant Properties | | | |
|---|---|---|---|---|
| | 1 | 2 | 3 | 4 |
| at 120°F. | 10/0 | 0/0 | 120/20 | 0/0 |

*The procedure and apparatus used for the dynamic foam measurements may be found in "Soap & Chemical Specialties" 37, 55, April 1961.

The embodiments of the invention in which an exclusive property or privilege is claimed are defined as follows:

1. A surfactant having the formula

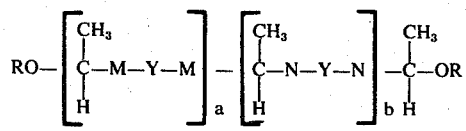

wherein R is an alkyl radical containing 1 to 4 carbon atoms, Y is the residue of an organic compound selected from the group consisting of ethylene glycol, diethylene glycol, propylene glycol, dipropylene glycol, butylene glycol, amylene glycol, hexylene glycol, heptylene glycol and octylene glycol, minus the terminal hydrogens, M is a hydrophilic chain of units selected from the group consisting of oxyethylene and oxyethylene-oxypropylene units wherein the oxyethylene content of said hydrophilic chain is from about 75 to 100 weight percent and the oxypropylene content is from 0 to about 25 weight percent, the total number of oxyethylene and oxypropylene units in M being from about 4 to about 30, N is a hydrophobic chain of units selected from the group consisting of oxypropylene units and oxyethylene-oxypropylene units wherein the oxypropylene content is from about 75 to 100 weight percent and the oxyethylene content is from 0 to about 25 weight percent, the total number of oxyethylene and oxypropylene groups in N being from about 4 to about 20, wherein groups

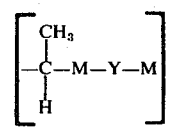

and

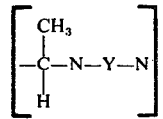

may be linked either in a random or an ordered manner, and $a$ and $b$ are numbers from 2 to 20 in a ratio between 1:9 to 9:1.

2. The surfactant of claim 1 wherein the alkyl radical R is ethyl.

* * * * *